United States Patent
Abbasfar et al.

(10) Patent No.: US 8,571,126 B2
(45) Date of Patent: Oct. 29, 2013

(54) MULTI-ANTENNA TRANSMITTER FOR MULTI-TONE SIGNALING

(75) Inventors: Aliazam Abbasfar, Sunnyvale, CA (US); Abbas Komijani, Mountain View, CA (US)

(73) Assignee: Rambus Inc., Sunnyvale, CA (US)

( * ) Notice: Subject to any disclaimer, the term of this patent is extended or adjusted under 35 U.S.C. 154(b) by 460 days.

(21) Appl. No.: 12/532,107

(22) PCT Filed: Apr. 22, 2008

(86) PCT No.: PCT/US2008/061117
§ 371 (c)(1),
(2), (4) Date: Mar. 10, 2010

(87) PCT Pub. No.: WO2008/144151
PCT Pub. Date: Nov. 27, 2008

(65) Prior Publication Data
US 2010/0183090 A1    Jul. 22, 2010

Related U.S. Application Data

(60) Provisional application No. 60/930,428, filed on May 15, 2007.

(51) Int. Cl.
*H04B 7/02*    (2006.01)
(52) U.S. Cl.
USPC .......................................................... 375/267
(58) Field of Classification Search
None
See application file for complete search history.

(56) References Cited

U.S. PATENT DOCUMENTS

| | | | | |
|---|---|---|---|---|
| 5,914,933 | A | 6/1999 | Cimini et al. | 370/208 |
| 6,005,876 | A * | 12/1999 | Cimini et al. | 370/525 |
| 7,095,790 | B2 | 8/2006 | Krishnan et al. | 375/260 |
| 2006/0023666 | A1 * | 2/2006 | Jalali et al. | 370/334 |
| 2006/0083195 | A1 | 4/2006 | Forenza et al. | 370/328 |
| 2006/0115010 | A1 | 6/2006 | Rog et al. | 375/260 |

(Continued)

FOREIGN PATENT DOCUMENTS

| | | |
|---|---|---|
| EP | 1357718 A2 | 4/2003 |
| EP | 1357718 A3 | 4/2003 |

OTHER PUBLICATIONS

Cimini et al., Clustered OFDM with Transmitter Diversity and Coding, 1996, IEEE.*

(Continued)

*Primary Examiner* — Chieh M Fan
*Assistant Examiner* — Wednel Cadeau
(74) *Attorney, Agent, or Firm* — Barcelo, Harrison & Walker LLP

(57) ABSTRACT

Embodiments of a communication circuit are described. This communication circuit includes an input node (212) to receive a set of data symbols and a partitioner (216) coupled to the input node. The partitioner is to divide the set of data symbols into M irregular subgroups of data symbols, a given one of which includes non-consecutive data symbols in the set of data symbols. Moreover, this given irregular subgroup of data symbols includes at least two pairs of adjacent data symbols having different inter-data-symbol spacings in the set of data symbols. This communication circuit also includes M modulators (218-1, 218-N1) coupled to the partitioner, where the given irregular subgroup of data symbols is coupled to a given modulator in the M modulators. Furthermore, the communication circuit includes M output nodes, where a given output node in the M output nodes is coupled to the given modulator and is to couple to an antenna element in M antenna elements (226).

24 Claims, 6 Drawing Sheets

(56) References Cited

U.S. PATENT DOCUMENTS

| | | | |
|---|---|---|---|
| 2006/0262714 A1 | 11/2006 | Tarokh et al. | 370/208 |
| 2007/0076583 A1* | 4/2007 | Hadad | 370/203 |
| 2008/0080631 A1 | 4/2008 | Forenza et al. | 375/260 |
| 2008/0118004 A1 | 5/2008 | Forenza et al. | 375/299 |
| 2008/0130790 A1 | 6/2008 | Forenza et al. | 375/299 |
| 2008/0273618 A1 | 11/2008 | Forenza et al. | 375/261 |

OTHER PUBLICATIONS

Cimini Jr., Leonard J. et al., "Clustered OFDM with Transmitter Diversity and Coding", pp. 703-707, 1996 IEEE.

International Preliminary Report on Patentability (Chapter I) includes Written Opinion with mail date of Nov. 26, 2009, for Int'l. Application No. PCT/US2008/061117 filed on Apr. 22, 2008. 5 pages.

Molisch, Andreas F. et al., "Space-Time-Frequency (STF) Coding for MIMO-OFDM Systems", IEEE Communications Letters, vol. 6, No. 9, Sep. 2002, pp. 370-372. 3 Pages.

Perlman, Steve et al., "Distributed-Input-Distributed-Output (DIDO) Wireless Technology," A New Approach to Multiuser Wireless, Jul. 27, 2011. http://www.rearden.com/DIDO/DIDO White Paper 110727.pdf. 19 Pages.

* cited by examiner

```
                                          ┌─ 500
┌─────────────────────────────────────────────────────────────┐
│  PARTITION A SET OF DATA SYMBOLS INTO M IRREGULAR SUBGROUPS OF │
│  DATA SYMBOLS, WHERE A GIVEN IRREGULAR SUBGROUP OF DATA SYMBOLS │
│  IN THE M IRREGULAR SUBGROUPS OF DATA SYMBOLS INCLUDES NON-   │
│  CONSECUTIVE DATA SYMBOLS IN THE SET OF DATA SYMBOLS, AND WHERE │
│  THE GIVEN IRREGULAR SUBGROUP OF DATA SYMBOLS INCLUDES AT LEAST │
│  TWO PAIRS OF ADJACENT DATA SYMBOLS HAVING DIFFERENT INTER-DATA- │
│         SYMBOL SPACINGS IN THE SET OF DATA SYMBOLS            │
│                            510                                │
└─────────────────────────────────────────────────────────────┘
                              │
                              ▼
┌─────────────────────────────────────────────────────────────┐
│  MODULATE THE M IRREGULAR SUBGROUPS OF DATA SYMBOLS USING M  │
│  MODULATORS, WHERE THE GIVEN IRREGULAR SUBGROUP OF DATA SYMBOLS │
│    IS MODULATED USING A GIVEN MODULATOR IN THE M MODULATORS  │
│                            512                                │
└─────────────────────────────────────────────────────────────┘
                              │
                              ▼
┌─────────────────────────────────────────────────────────────┐
│   TRANSMIT SIGNALS USING M ANTENNA ELEMENTS, WHERE A GIVEN   │
│   ANTENNA ELEMENT IN THE M ANTENNA ELEMENTS TRANSMITS SIGNALS │
│                FROM THE GIVEN MODULATOR                       │
│                            514                                │
└─────────────────────────────────────────────────────────────┘
```

FIG. 5

MULTI-ANTENNA TRANSMITTER FOR MULTI-TONE SIGNALING

FIELD OF INVENTION

The present embodiments relate to techniques for communicating signals. More specifically, the present embodiments relate to circuits and methods for communicating information using multi-tone signaling based on irregular subgroups of data symbols.

BACKGROUND

Multi-tone signaling is an increasingly popular communication technique. During multi-tone signaling, a usable range of frequencies in a communication channel is divided into a series of frequency bands or sub-channels. Then, data, which is to communicated via the communication channel, is modulated using a transform operation and is subsequently up-converted using a group of carrier frequencies.

Multi-tone signaling becomes more effective as the number of frequency tones increases. However, the complexity of a communication system that uses multi-tone signaling increases with the number of sub-channels.

Furthermore, multi-tone signaling typically has high peak-to-average power ratio (PAPR). Unfortunately, high PAPR can reduce the efficiency of power amplifiers in the communication system. For example, if there is clipping in the power amplifiers, spectral re-growth (i.e., nonlinearities) will occur. Furthermore, while the PAPR can be reduced by adding redundancy (for example, additional power amplifiers), this redundancy will also increase the complexity and cost of the communication system.

Hence, what is needed are circuits and techniques which can be used in communication systems that overcome the problems listed above.

BRIEF DESCRIPTION OF THE FIGURES

FIG. 5 is a flow chart illustrating an embodiment of a process for communicating data.

Note that like reference numerals refer to corresponding parts throughout the drawings.

DETAILED DESCRIPTION

Figure 1A:
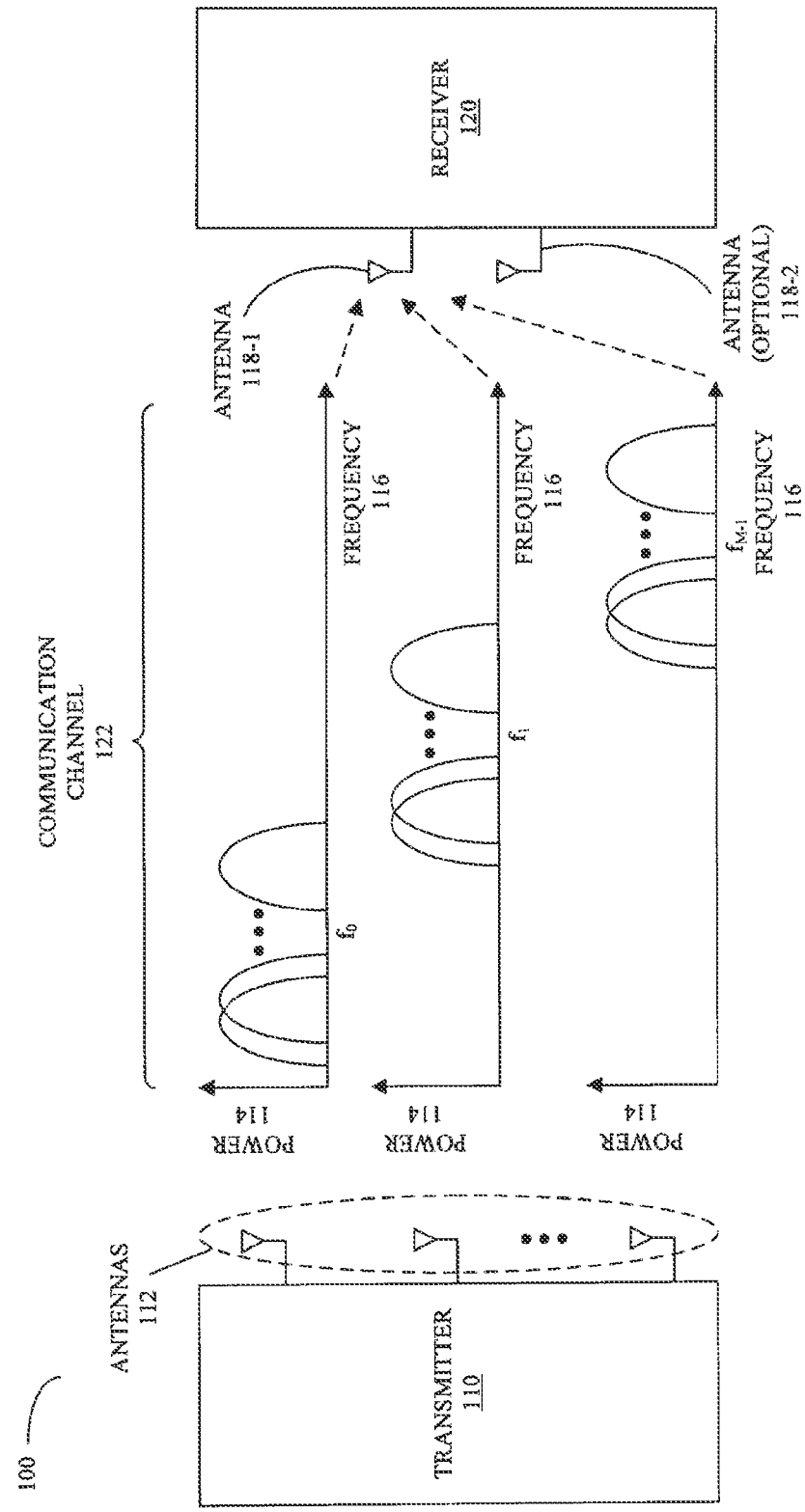
FIG. 1A is a block diagram illustrating an embodiment of a communication system.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

Embodiments of a communication circuit, an integrated circuit that includes the communication circuit, and a technique for communicating between devices in a communication system are described. This communication circuit includes an input node to receive a set of data symbols and a partitioner coupled to the input node. This partitioner is to divide the set of data symbols into M irregular subgroups of data symbols, a given one of which includes non-consecutive data symbols in the set of data symbols. Moreover, this given irregular subgroup of data symbols includes at least two pairs of adjacent data symbols having different inter-data-symbol spacings in the set of data symbols. This communication circuit also includes M modulators coupled to the partitioner, where the given irregular subgroup of data symbols is coupled to a given modulator in the M modulators. Furthermore, the communication circuit includes M output nodes, where a given output node in the M output nodes is coupled to the given modulator and is to couple to an antenna element in M antenna elements.

In some embodiments, the communication circuit includes the M antenna elements. Note that the M antenna elements may be included in a multi-element antenna. Moreover, in some embodiments the M antenna elements are to implement spatial diversity during wireless communication with a second communication circuit.

In some embodiments, the M irregular subgroups of data symbols are fixed.

In some embodiments, the given modulator includes frequency up-conversion to an associated band of frequencies. Moreover, in some embodiments the given modulator includes an inverse fast Fourier transform (IFFT). This IFFT may include NIM sampling points, where N is between 32 and 2048 and M is between 2 and 16. Alternatively, the IFFT may include N sampling points, where N is between 32 and 2048.

In some embodiments, the M modulators include orthogonal frequency division multiplexing (OFDM). Note that the given irregular subgroup of data symbols includes data symbols corresponding to an OFDM symbol.

In some embodiments, the communication circuit includes M amplifiers (such as power amplifiers), where a given amplifier in the M amplifiers is coupled between the given modulator and the given output node.

In some embodiments, at least two of the M irregular subgroups of data symbols are to include a different number of data symbols.

In some embodiments, the communication circuit is to reduce a peak-to-average power ratio (PAPR) of a modulated signal at the given output node by more than $M^{-1}$ relative to the PAPR of a modulated signal corresponding to the set of data symbols.

In some embodiments, the communication circuit includes control logic. This control logic is to dynamically allocate data symbols to the irregular subgroups of data symbols in the M irregular subgroups of data symbols based on the set of data symbols.

In some embodiments, the communication circuit includes a delay element coupled between the input node and the partitioner, and the control logic is to determine the dynamic allocation using a feed-forward loop. Note that this dynamic allocation may be to reduce an average or a standard deviation of the PAPR of a modulated signal at the given output node.

However, in some embodiments the control logic is to determine the dynamic allocation based on an estimated PAPR at one or more of the M output nodes. For example, the dynamic allocation may be determined in order to reduce an estimated PAPR at the M output nodes.

In some embodiments the control logic is to determine the dynamic allocation using pre-determined allocations corresponding to data symbol patterns in the set of data symbols.

Another embodiment provides a system that includes a first device and a second device. This first device includes the communication circuit. Furthermore, the second device is to: receive signals from the first device via a wireless communication channel, demodulate the received signals, and detect the set of data symbols.

Another embodiment provides a method for communicating data. During this method, a set of data symbols is partitioned into the M irregular subgroups of data symbols. Then, the M irregular subgroups of data symbols are modulated using M modulators, where the given irregular subgroup of data symbols is modulated using a given modulator in the M modulators. Next, the M antenna elements transmit signals, where a given antenna element in the M antenna elements transmits signals from the given modulator.

The aforementioned embodiments may be used in a wide variety of applications, including: serial or parallel wireless links, wireless metropolitan area networks (such as WiMax), wireless local area networks (WLANs), wireless personal area networks (WPANs), and systems and devices that include multiple antennas. Furthermore, the aforementioned embodiments may be used in: desktop or laptop computers, hand-held or portable devices (such as personal digital assistants and/or cellular telephones), set-top boxes, home networks, and/or video-game devices.

We now describe embodiments of a wireless communication system using multi-tone signaling and irregular subgroups of symbols. FIG. 1A presents a block diagram illustrating an embodiment of a communication system 100. In this system, a transmitter 110 in a first device communicates data (such as a set of data symbols) via a communications channel 122 with a receiver 120 in a second device. In an exemplary embodiment, the data is communicated using wireless communication (for example, using a 7 GHz frequency band centered on 60 GHz or using a frequency band between 50 and 90 GHz). However, in other embodiments the data is communicated using wireline communication and/or optical communication.

Note that while the communication in the communication system 100 is illustrated in one direction (between the transmitter 110 and the receiver 120), in other embodiments the communication between the devices may be simultaneous (i.e., full duplex communication in which both devices may transmit and receive information at the same time) or the communication direction may alternate (i.e., half duplex communication in which, at a given time, one device transmits information and the other device receives information).

Transmitter 110 may be coupled to multiple antennas 112. Each of these antennas may be used to transmit signals corresponding to a given sub-channel in the communications channel 122. For example, there may be M antennas 112, each of which is used to transmit signals corresponding to one of M sub-channels. Moreover, these signals are received by receiver 120 using antenna 118-1. Note that in some embodiments these signals are also received by one or more additional antennas, such as optional antenna 118-2.

Signals carried on these sub-channels may be time-multiplexed, frequency multiplexed, and/or encoded. Thus, in some embodiments the given communication channel uses time-division multiple access (TDMA), frequency-division multiple access (FDMA), and/or code-division multiple access (CDMA). In an exemplary embodiment, signals on the communication channel 122 use discrete multi-tone communication (such as orthogonal frequency-division multiplexing or OFDM).

In the communication system 100, spectral content associated with the sub-channels is illustrated in plots of power 114 as a function of frequency 116. Note that the given sub-channel is associated with one or more carrier frequencies or frequency tones (such as $f_0$, $f_1$, and $f_{M-1}$). In addition, the given sub-channel has an associated range of frequencies, a frequency band, or groups of frequency bands (henceforth referred to as a frequency band). In some embodiments, frequency bands for adjacent sub-channels may partially or completely overlap, or may not overlap. For example, there may be partial overlap of neighboring frequency bands, which occurs in so-called approximate bit loading. Furthermore, signals on adjacent sub-channels may be orthogonal.

Figure 1B:
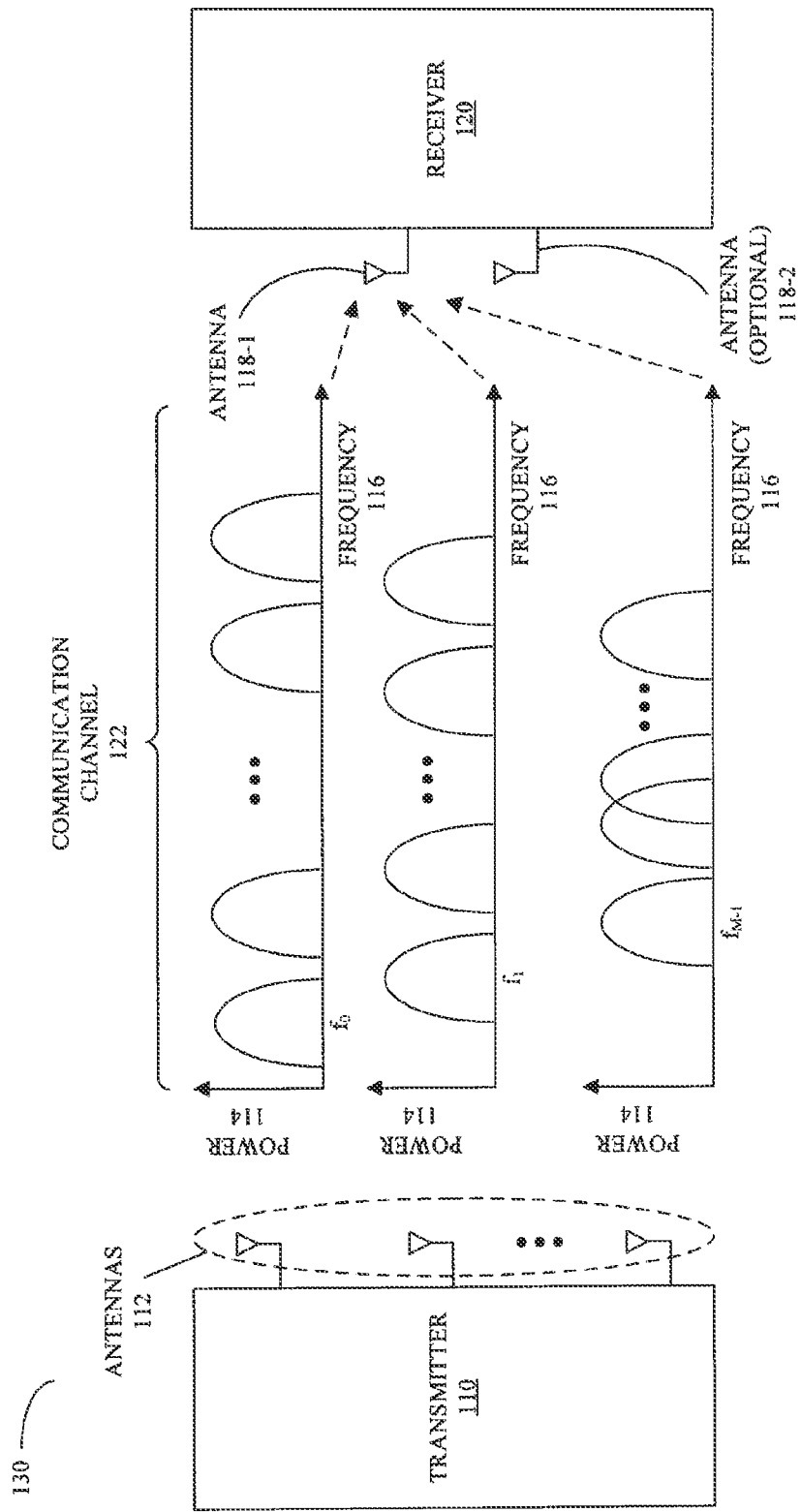
FIG. 1B is a block diagram illustrating an embodiment of a communication system.

Note that while communication system 100 illustrates a particular configuration of frequency bands in the sub-channels, other configurations may be used. This is shown in FIG. 1B, which presents a block diagram illustrating an embodiment of a communication system 130.

Referring back to FIG. 1A, in some embodiments the antennas 112 are used to provide spatial diversity (such as multiple-input multiple-output communication) and/or polarization diversity. For example, the antennas may provide directional gain over a range of transmit angles, thereby providing more robust communication between the devices when obstacles disrupt at least a portion of the communication channel 122. In some embodiments, signals transmitted by different antennas in the antennas 112 are distinguished from each other based on: encoding (such as TDMA, FDMA, and/or CDMA), spatial diversity, and/or polarization diversity.

In some embodiments, the antennas 112 are included in a multi-element antenna. Moreover, in some embodiments beam forming is used to provide directional communication between the devices. For example, phase encoding of the signals transmitted by two or more of the antennas 112 may be used to provide: a directional antenna pattern, shaped beams, and/or to change a transmit direction associated with one or more of the shaped beams.

Data to be communicated using communication channel 122 may be partitioned among the available sub-channels, i.e., subgroups of data symbols may be assigned to a given sub-channel. As discussed further below with reference to FIG. 3, this partitioning may result in irregular subgroups of data symbols.

Note that the partitioning (as well as the modulating and/or encoding) may be fixed, or may be dynamically adapted or adjusted based on one or more performance metrics associated with one or more of the sub-channels. Note that the one or more performance metrics may include: a signal strength (such as a signal amplitude or a signal intensity), a mean square error (MSE) relative to a target (such as a threshold, a point in a constellation diagram, and/or a sequence of points in a constellation diagram), a signal-to-noise ratio (SNR), a bit-error rate (BER), a timing margin, a voltage margin, and/or the PAPR associated with one or more of the sub-channels.

In some embodiments, control logic (not shown) in either of the devices dynamically adjusts the partitioning, encoding, and/or modulating of the set of data symbols. During the adjusting, the control logic (such as control logic 228 and/or 270 in FIGS. 2A and 2B) may exchange control information with each other using in-band communication (i.e., via the frequency bands used in the communication channel 122) or out-of-band communication (for example, using another communication channel). For example, in-band communication and/or out-of-band communication may be used to provide feedback (such as one or more performance metrics) about the communication between the devices, as well as the resulting control information (including changes to the partitioning, encoding, and/or modulating of the set of data symbols). Moreover, out-of-band communication may occur via a separate link between the devices. This separate link: may be wireless or wired; may have a lower data rate than the data rates associated with one or more of the sub-channels; may use one or more different carrier frequencies than are used in the sub-channels; and/or may use a different modulation technique than is used in the sub-channels. Note that in some embodiments the dynamically adjusting is performed: continuously; as need based on the performance metric; and/or after a pre-determined time interval (such as a time interval associated with the set of data symbols).

In some embodiments, the dynamic adjusting involves an auto-negotiation technique between the devices. During this auto-negotiation technique, receiver 120 may provide feedback to transmitter 110 on the efficacy of any changes to the signals on communication channel 122. Based on this feedback, transmitter 110 may further modify the signals (henceforth referred to as remedial action). Note that the remedial action may include: re-transmitting previous data; transmitting previous or new data (henceforth referred to as data) using an increased transmission power than the transmission power used in a previous transmission; reducing the data rate in one or more of the sub-channels relative to the data rate used in a previous transmission; transmitting data with reduced intersymbol interference (for example, with blank intervals inserted before and/or after the data); transmitting data at a single clock edge (as opposed to dual-data-rate transmission); transmitting data with at least a portion of the data including an error-correction code (ECC) or an error-detection code (EDC); transmitting data using a different encoding or modulation code than the encoding used in a previous transmission; transmitting data after a pre-determined idle time; transmitting data to a different receiver; transmitting data to another device (which may attempt to forward the data to receiver 120); changing the number of sub-channels; and/or changing the partitioning of the set of data symbols.

Note that communication system 100 and the communication system 130 (FIG. 1B) may include fewer components or additional components. Furthermore, two or more components may be combined into a single component, and the position of one or more components may be changed.

Figure 2A:
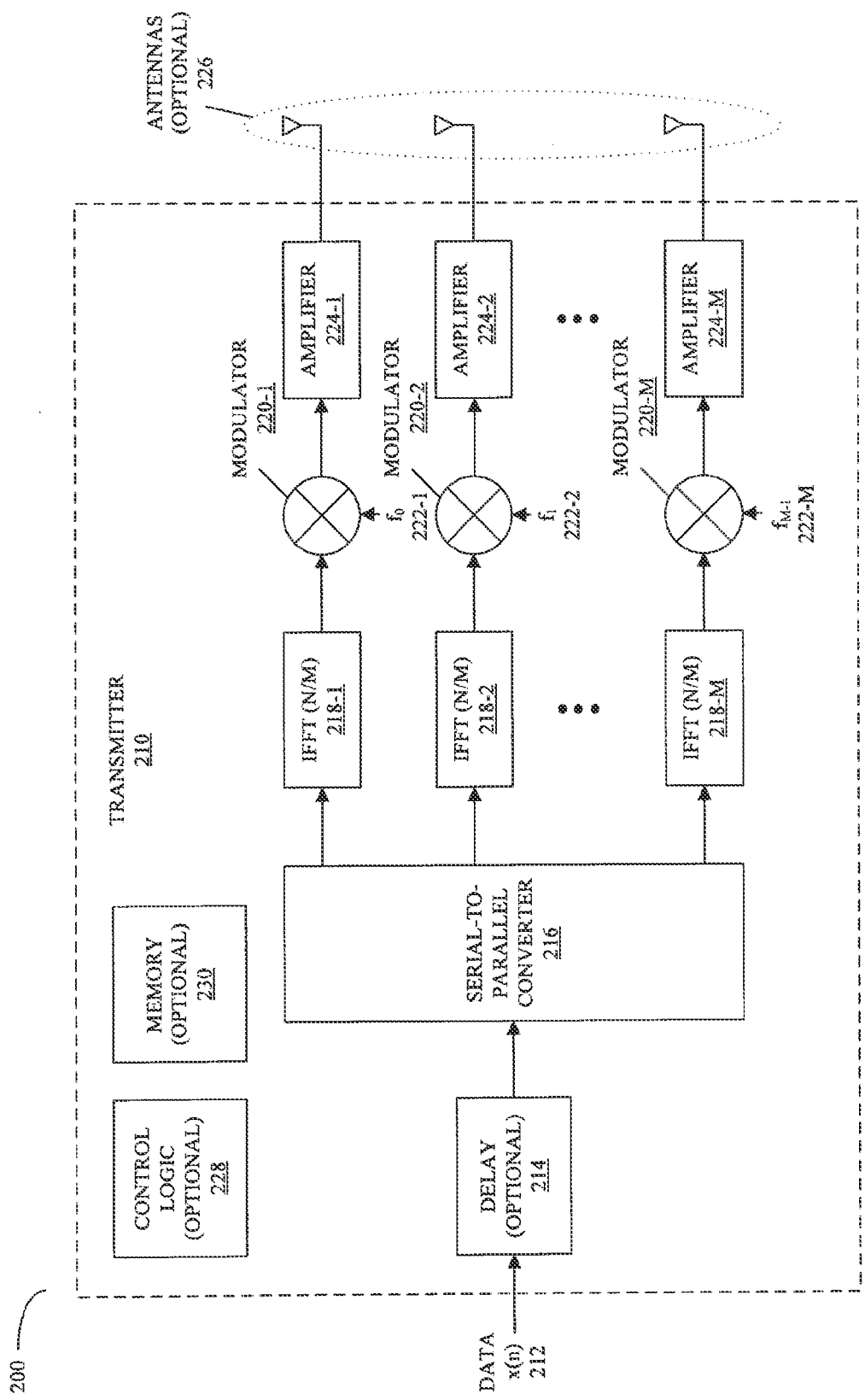
FIG. 2A is a block diagram illustrating an embodiment of a communication circuit.

We now describe embodiments of a communication circuit in the transmitter 110. FIG. 2A presents a block diagram illustrating an embodiment of a communication circuit 200 which includes a transmitter 210. This circuit may be used to: partition data x(n) 212 into M irregular subgroups; to perform baseband encoding and modulation of the data in the M subgroups; to RF up-convert the data in the M subgroups into signals corresponding to M sub-channels; and to transmit these signals using M antennas or M antenna elements (where signals corresponding to a given sub-channel are transmitted using a given antenna or a given antenna element).

Communication circuit 200 receives data x(n) 212. This data may, at least in part, already be encoded. As an illustrative example, in the discussion that follows data x(n) 212 includes a set of data symbols. However, as discussed further below, note that at least a portion of the data encoding is performed in sections of the communication circuit 200 that are associated with the sub-channels (including IFFT circuits 218, modulators 220, and amplifiers 224). In some embodiments, optional control logic 228 controls at least the portion of the data encoding. For example, optional control logic 228 may select at least the portion of the data encoding from look-up tables stored in optional memory 230.

Note that encoding should be understood to include modulation coding and/or spread-spectrum encoding, for example, coding based on binary pseudorandom sequences (such as maximal length sequences or m-sequences), Gold codes, and/or Kasami sequences. Furthermore, modulation coding may include bit-to-symbol coding, in which one or more data bits are mapped together to a data symbol. For example, a group of two data bits can be mapped to: one of four different amplitudes of an encoded data signal; one of four different phases of a sinusoid; or a combination of one of two different amplitudes of a sinusoid and one of two different phases of the same sinusoid (such as in quadrature amplitude modulation or QAM).

In general, the modulation coding may include: amplitude modulation, phase modulation, and/or frequency modulation, such as pulse amplitude modulation (PAM), pulse width modulation, and/or pulse code modulation. For example, the modulation coding may include: two-level pulse amplitude modulation (2-PAM), four-level pulse amplitude modulation (4-PAM), eight-level pulse amplitude modulation (8-PAM), sixteen-level pulse amplitude modulation (16-PAM), two-level on-off keying (2-OOK), four-level on-off keying (4-OOK), eight-level on-off keying (8-OOK), and/or sixteen-level on-off keying (16-OOK). In addition, as noted previously, the data signals may be encoded using TDMA, FDMA, and/or CDMA.

In some embodiments, the modulation coding includes non-return-to-zero (NRZ) coding. Furthermore, in some embodiments the modulation coding includes two-or-more-level QAM. Note that different sub-channels in communication channel 122 (FIGS. 1A and 1B) may be encoded differently and/or the modulation coding may be dynamically adjusted. Thus, in some embodiments the number of bits per symbol in the data x(n) 212 and/or in one or more of the sub-channels is dynamically adjusted, thereby modifying the corresponding data rate(s).

As was also discussed previously, in some embodiments at least a portion of the data includes error-detection-code (EDC) information and/or error-correction-code (ECC) information. For example, signals may be transmitted with pre-existing ECC information incorporated into at least a portion of the data (such as in one or more data packets). Alternatively, ECC information may be dynamically generated (i.e., in real time) based on at least a portion of the data, and this ECC information may then be included with the transmitted data.

In some embodiments, the ECC includes a Bose-Chaudhuri-Hochquenghem (BCH) code. Note that BCH codes are a sub-class of cyclic codes. In exemplary embodiments, the ECC includes: a cyclic redundancy code (CRC), a parity code, a Hamming code, a Reed-Solomon code, and/or another error checking and correction code.

After receiving data x(n) 212, this data is optionally delayed 214 and partitioned into M irregular subgroups of data symbols using a partitioner, such as serial-to-parallel converter 216. Note that in the communication circuit 200 the partitioning is fixed, i.e., the M irregular subgroups of data symbols corresponding to the sub-channels are fixed.

Figure 3:
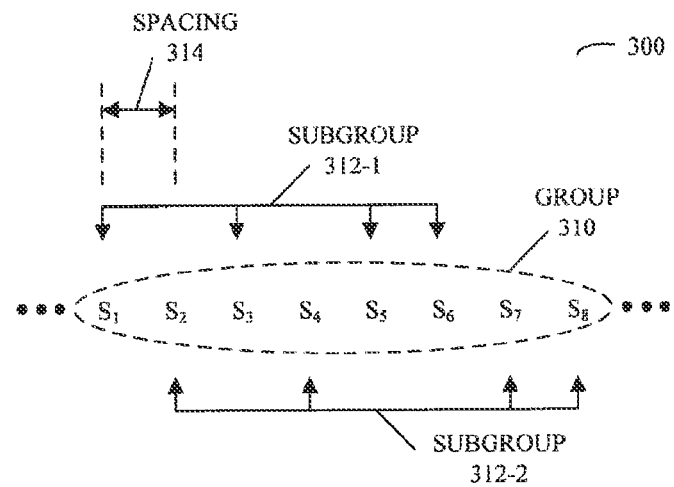
FIG. 3 is a block diagram illustrating an embodiment of a technique for partitioning a group of data symbols into irregular subgroups.

FIG. 3 presents a block diagram illustrating an embodiment 300 of a technique for partitioning a group of data symbols 310 into irregular subgroups of data symbols 312.

Instead of decimating the group of data symbols 310 (into even or odd data symbols) or partitioning the group of data symbols 310 into two halves, note that a given subgroup of data symbols (such as subgroup of data symbols 312-1) includes non-consecutive data symbols ($S_1$, $S_3$, $S_5$, and $S_6$) in the set of data symbols 310. Moreover, the given subgroup of data symbols includes at least two pairs of adjacent data symbols having different inter-data-symbol spacings in the set of data symbols. Thus, adjacent data symbols in the subgroup of data symbols 312-1 are either spaced by spacing 314 or twice this value.

Referring back to FIG. 2A, after partitioning, the M subgroups of data symbols are each modulated separately using one of the M IFFT circuits 218. Each of these circuits performs an IFFT having N/M sampling points, which is used as an illustration of a modulation transformation. In an exemplary embodiment, N is between 32 and 2048 and M is between 2 and 16.

Note that in some embodiments each of the IFFT circuits 218 generates one full symbol (such as an OFDM symbol) for transmission. Thus, each sub-channel may be associated with one frequency tone. Consequently, IFFT circuits 218 may be implemented with reduced complexity. In some embodiments, IFFT circuits 218 are further simplified by using proper partitioning (for example, the irregular subgroups may each include an even number of data symbols).

Figure 4:
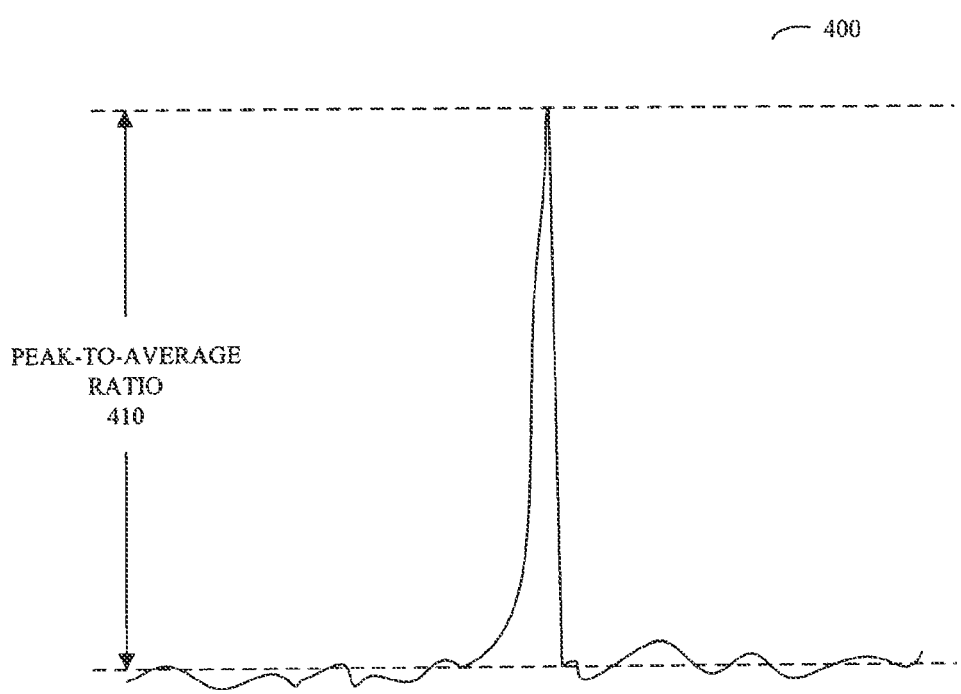
FIG. 4 is a block diagram illustrating an example of a peak-to-average ratio (PAPR).

Furthermore, note that because of the reduced number of frequency tones in any given sub-channel, the resulting PAPR of at least one of the sub-channels is reduced by a factor of $M^{-1}$ relative to the PAPR of a modulated signal corresponding to the set of data symbols. FIG. 4 presents a block diagram illustrating an example 400 of a peak-to-average ratio 410, showing the peak signal power relative to the noise floor. Referring back to FIG. 2A, also note this reduction in PAPR may allow the amplifiers 224 to be more efficient. For example, nonlinearities (such as clipping) may be reduced and/or a number of amplifiers 224 (i.e., redundancy in communication circuit 200) may be reduced.

After this baseband modulation, the data symbols are RF up-converted to the appropriate frequency bands using carrier frequencies $f_i$ 222 associated with the sub-channels. For example, the up-conversion may use frequency-conversion elements, such as heterodyne mixers or modulators 220.

Next, the resulting up-converted signals are amplified using amplifiers 224 and the amplified signals for a given sub-channel are transmitted using one of M antennas. Note that by using a given antenna in M antennas to transmit the signals corresponding to a given sub-channel, the communication circuit 200 provides a directional gain of M.

In some embodiments, the communication circuit 200 optionally includes M antennas 226 or M antenna elements. Thus, the optional M antennas 226 may be: external to the communication circuit 200, on-chip, on the package or chip carrier, and/or on another integrated circuit (for example, in a chip stack). Note that in some embodiments, the optional M antennas 226 are included in a phased-array antenna.

Figure 2B:
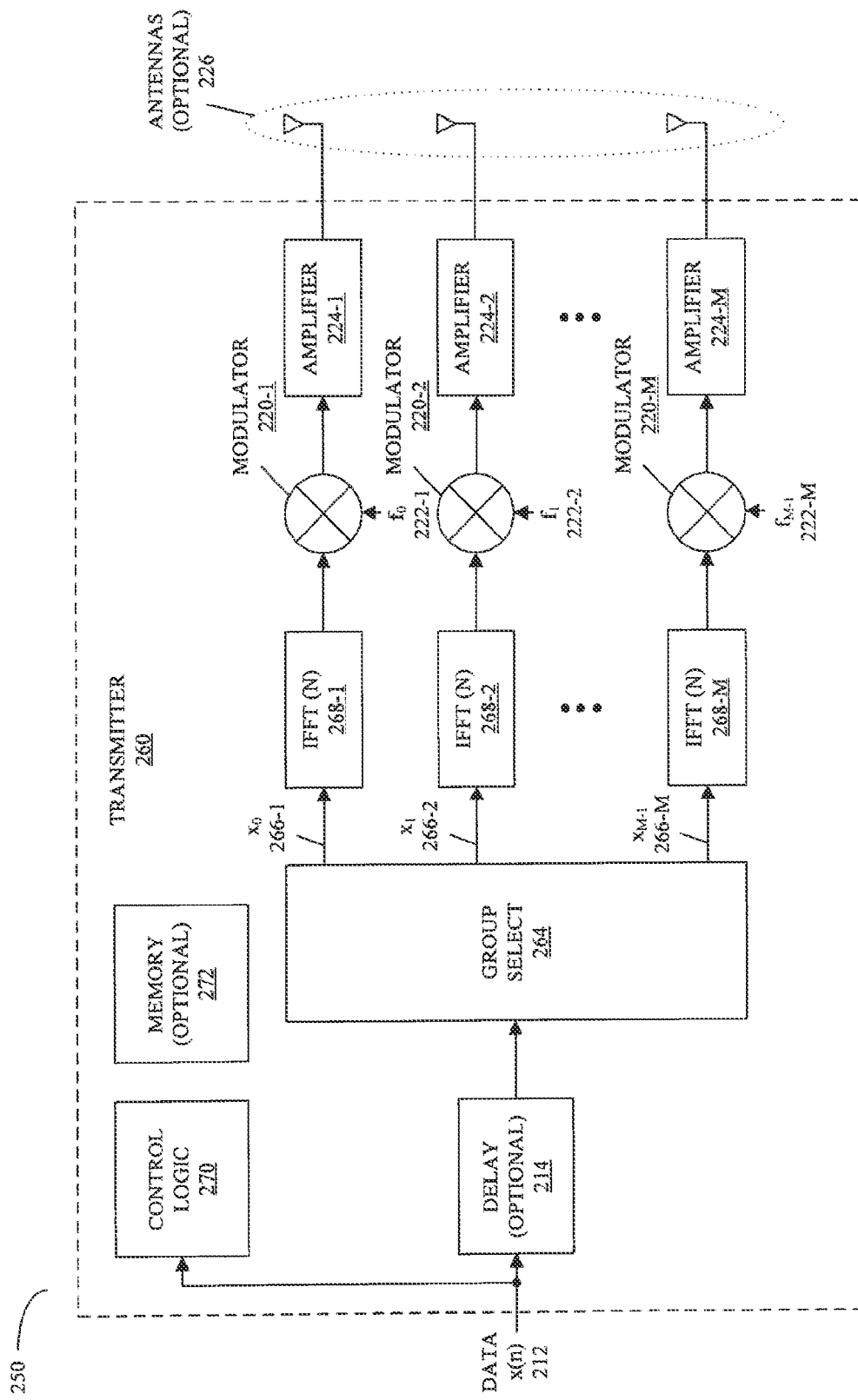
FIG. 2B is a block diagram illustrating an embodiment of a communication circuit.

Note the use of M antennas provides additional flexibility that can be exploited to further reduce the PAPR. In particular, the partitioning of data x(n) 212 may dynamically adjusted or adapted, thereby shuffling the frequency tones between the sub-channels so that the PAPR in all the sub-channels is reduced (i.e., the reduction in the PAPR is more than $M^{-1}$). Thus, data symbols in the set of data symbols may be dynamically assigned or allocated on a symbol-by-symbol basis into irregular sub-groups of data symbols (which, in general, will have a different number of data symbols), and thus, to different sub-channels. This is shown in FIG. 2B, which presents a block diagram illustrating an embodiment of a communication circuit 250 which includes a transmitter 260.

In communication circuit 250, group select 264 partitions data x(n) 212 into irregular subgroups $x_i$ 266 based on control signals provided by control logic 270. For example, control logic 270 may select an irregular-subgroup configuration from a look-up table stored in optional memory 272. Then, each of these subgroups is modulated separately using IFFT circuits 268. Note that each of these circuits performs an IFFT having N sampling points. In an exemplary embodiment, N is between 32 and 2048. Furthermore, note that in this case, because the dynamic partitioning is non-uniform, after the IFFT is performed the number of frequency tones in the sub-channels may be different and/or may vary as a function of time.

In some embodiments, control logic 270 determines or selects the partitioning using a feed-forward loop, i.e., the partitioning is based on one or more data symbols received by communication circuit 250. In some embodiments, to allow time for the control logic 270 to determine or select the partitioning, data x(n) 212 is delayed using optional delay 214. Furthermore, the partitioning may be determined or selected in order to reduce an average or a standard deviation of the PAPR associated with one or more of the sub-channels.

In some embodiments the partitioning is determined or selected in order to reduce and/or minimize the PAPR for a given data symbol or the estimated PAPR for a given data symbol. For example, a min-max technique may be used to systematically analyze different subgroup configurations and to select the one that reduces or minimizes the largest peak in the M transmit symbols (such as the largest peak in M OFDM symbols). Alternatively, in some embodiments control logic 270 selects a pre-determined configuration of subgroups based on the set of data symbols (i.e., based on symbol patterns in the set of data symbols). This pre-determined configuration, which may be stored in optional memory 272, may provide improved PAPR performance.

As discussed previously, the transmitted signals may be received by a receiver (such as receiver 120 in FIGS. 1A and 1B) using one or more antennas. Note that the signals corresponding to the sub-channels are combined or superimposed during transmission in the air. Therefore, this receiver may perform: RF down-conversion, baseband demodulation (for example, using an N-point FFT), and baseband decoding. Note that this decoding may include symbol-to-bit encoding that is the opposite or the inverse of the bit-to-symbol encoding performed prior to transmitting the signals. Moreover, in some embodiments the receiver implements error detection and/or correction. For example, errors may be detected by performing a multi-bit XOR operation in conjunction with one or more parity bits in the transmitted signals.

Note that communication circuits 200 (FIG. 2A) and/or 250 may include fewer components or additional components. For example, signal lines coupling components may indicate multiple signal lines (or a bus). In some embodiments, communication circuits 200 (FIG. 2A) and/or 250 include pre-emphasis to compensate for losses and/or dispersion associated with one or more of communication channels. Similarly, in some embodiments a receiver of the signals includes equalization. Note that pre-emphasis and/or equalization may be implemented using feed-forward filters and/or decision-feedback-equalization circuits.

In some embodiments, communication circuits 200 (FIG. 2A) and/or 250 includes receiver circuitry. Thus, either or both of these circuits may include transceiver circuits.

Moreover, while not explicitly shown in communication circuits 200 (FIG. 2A) and 250, these circuits may include memory buffers for the transmit signals. In addition, clocking circuits are not explicitly illustrated in communication circuits 200 (FIG. 2A) and 250. Nonetheless, signals may be transmitted and/or received based on either or both edges in one or more clock signals. Note that in some embodiments transmitting and receiving may be synchronous and/or asynchronous.

Components and/or functionality illustrated in communication circuit 200 (FIG. 2A) and/or 250 may be implemented using analog circuits and/or digital circuits. Furthermore, components and/or functionality in either of these communication circuits may be implemented using hardware and/or software. In some embodiments, control logic 270 operates on physical-layer structures in communication circuit 250 (such as an RF front-end) without using information from baseband-processing components.

Note that two or more components in communication circuits 200 (FIG. 2A) and/or 250 may be combined into a single component and/or the position of one or more components may be changed. In some embodiments, communication circuits 200 (FIG. 2A) and/or 250 are included in one or more integrated circuits on one or more semiconductor die.

We now describe embodiments of a process for communicating data. FIG. 5 presents a flow chart illustrating an embodiment of a process 500 for communicating data. During this process, a set of data symbols is partitioned into M irregular subgroups of data symbols (510), where a given irregular subgroup of data symbols in the M irregular subgroups of data symbols includes non-consecutive data symbols in the set of data symbols. Moreover, this given irregular subgroup of data symbols includes at least two pairs of adjacent data symbols having different inter-data-symbol spacings in the set of data symbols. Then, the M irregular subgroups of data symbols are modulated using M modulators (512), where the given irregular subgroup of data symbols is modulated using a given modulator in the M modulators. Next, M antenna elements transmit signals, where a given antenna element in the M antenna elements transmits signals from the given modulator (514).

Note that in some embodiments there may be additional or fewer operations in process 500. Furthermore, the order of the operations may be changed, and two or more operations may be combined into a single operation.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. An integrated circuit, comprising:
an input node to receive a set of data symbols;
a partitioner coupled to the input node, wherein the partitioner is to divide the set of data symbols into M irregular subgroups of data symbols, wherein a given irregular subgroup of data symbols in the M irregular subgroups of data symbols includes non-consecutive data symbols in the set of data symbols, and wherein the given irregular subgroup of data symbols includes at least two pairs of adjacent data symbols having different inter-data-symbol spacings in the set of data symbols;
M modulators coupled to the partitioner, wherein the given irregular subgroup of data symbols is coupled to a given modulator in the M modulators; and
M output nodes, wherein the given modulator is coupled to a given output node in the M output nodes, and wherein the given output node is to couple to an antenna element in M antenna elements.

2. The integrated circuit of claim 1, further comprising the M antenna elements.

3. The integrated circuit of claim 2, further comprising a multi-element antenna, wherein the multi-element antenna comprises the M antenna elements.

4. The integrated circuit of claim 1, wherein the M antenna elements are to implement spatial diversity during wireless communication with a second integrated circuit.

5. The integrated circuit of claim 1, wherein the M irregular subgroups of data symbols are fixed.

6. The integrated circuit of claim 1, wherein the given modulator includes frequency up-conversion to an associated band of frequencies.

7. The integrated circuit of claim 1, wherein the given modulator includes an inverse fast Fourier transform (IFFT).

8. The integrated circuit of claim 7, wherein the IFFT is an N/M-point IFFT, and wherein N is between 32 and 2048 and M is between 2 and 16.

9. The integrated circuit of claim 1, wherein the M modulators include orthogonal frequency division multiplexing (OFDM).

10. The integrated circuit of claim 1, further comprising M amplifiers, wherein a given amplifier in the M amplifiers is coupled between the given modulator and the given output node.

11. The integrated circuit of claim 1, wherein the given irregular subgroup of data symbols includes data symbols corresponding to an OFDM symbol.

12. The integrated circuit of claim 1, wherein at least two of the M irregular subgroups of data symbols are to include a different number of data symbols.

13. The integrated circuit of claim 1, wherein the integrated circuit is to reduce a peak-to-average power ratio (PAPR) of a modulated signal at the given output node by more than $M^{-1}$ relative to the PAPR of a modulated signal corresponding to the set of data symbols.

14. The integrated circuit of claim 1, further comprising control logic, wherein the control logic is to dynamically allocate data symbols to the irregular subgroups of data symbols in the M irregular subgroups of data symbols based on the set of data symbols.

15. The integrated circuit of claim 14, further comprising a delay element coupled between the input node and the partitioner, wherein the control logic is to determine the dynamic allocation using a feed-forward loop.

16. The integrated circuit of claim 14, wherein the dynamic allocation is to reduce an average or a standard deviation of the peak-to-average power ratio (PAPR) of a modulated signal at the given output node.

17. The integrated circuit of claim 14, wherein the given modulator includes an N-point IFFT.

18. The integrated circuit of claim 17, wherein N is between 32 and 2048.

19. The integrated circuit of claim 14, wherein the control logic is to determine the dynamic allocation based on an estimated peak-to-average power ratio (PAPR) at the M output nodes.

20. The integrated circuit of claim 14, wherein the control logic is to determine the dynamic allocation in order to reduce an estimated peak-to-average power ratio (PAPR) at the M output nodes.

21. The integrated circuit of claim 14, wherein the control logic is to determine the dynamic allocation using pre-determined allocations corresponding to data symbol patterns in the set of data symbols.

22. A system, comprising:
a first device, wherein the first device includes:
  an input node to receive a set of data symbols;
  a partitioner coupled to the input node, wherein the partitioner is to divide the set of data symbols into M irregular subgroups of data symbols, wherein a given irregular subgroup of data symbols in the M irregular subgroups of data symbols includes non-consecutive data symbols in the set of data symbols, and wherein the given irregular subgroup of data symbols includes at least two pairs of adjacent data symbols having different inter-data-symbol spacings in the set of data symbols;
  M modulators coupled to the partitioner, wherein the given irregular subgroup of data symbols is coupled to a given modulator in the M modulators; and
  M antenna elements, wherein the given modulator is coupled to a given antenna element in the M antenna elements, and wherein the given antenna element is to transmit signals corresponding to the given irregular subgroup of data symbols; and
a second device, wherein the second device is to receive signals from the first device via a wireless communication channel, and wherein the second device is to demodulate the received signals and is to detect the set of data symbols.

23. A method for communicating data, comprising:
partitioning a set of data symbols into M irregular subgroups of data symbols, wherein a given irregular subgroup of data symbols in the M irregular subgroups of data symbols includes non-consecutive data symbols in the set of data symbols, and wherein the given irregular subgroup of data symbols includes at least two pairs of adjacent data symbols having different inter-data-symbol spacings in the set of data symbols;
modulating the M irregular subgroups of data symbols using M modulators, wherein the given irregular subgroup of data symbols is modulated using a given modulator in the M modulators; and
transmitting signals using M antenna elements, wherein a given antenna element in the M antenna elements transmits signals from the given modulator.

24. A transmitter, comprising:
a memory;
a communication circuit coupled to the memory, comprising:
  an input node to receive a set of data symbols;
  a partitioner coupled to the input node, wherein the partitioner is to divide the set of data symbols into M irregular subgroups of data symbols, wherein a given irregular subgroup of data symbols in the M irregular subgroups of data symbols includes non-consecutive data symbols in the set of data symbols, and wherein the given irregular subgroup of data symbols includes at least two pairs of adjacent data symbols having different inter-data-symbol spacings in the set of data symbols;
  M modulators coupled to the partitioner, wherein the given irregular subgroup of data symbols is coupled to a given modulator in the M modulators; and
  M output nodes, wherein the given modulator is coupled to a given output node in the M output nodes, and wherein the given output node is to couple to an antenna element in M antenna elements.

\* \* \* \* \*